United States Patent
Tsuruma (10) Patent No.: US 11,063,532 B2
(45) Date of Patent: Jul. 13, 2021

(54) POWER CONVERSION DEVICE SUPERIMPOSING A TERTIARY HARMONIC WAVE

(71) Applicant: TOSHIBA MITSUBISHI-ELECTRIC INDUSTRIAL SYSTEMS CORPORATION, Chuo-ku (JP)

(72) Inventor: Yoshinori Tsuruma, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 59 days.

(21) Appl. No.: 16/603,350

(22) PCT Filed: May 18, 2017

(86) PCT No.: PCT/JP2017/018730
§ 371 (c)(1),
(2) Date: Oct. 7, 2019

(87) PCT Pub. No.: WO2018/211671
PCT Pub. Date: Nov. 22, 2018

(65) Prior Publication Data
US 2021/0152101 A1   May 20, 2021

(51) Int. Cl.
*H02M 7/538* (2007.01)
*H02M 7/5387* (2007.01)
(Continued)

(52) U.S. Cl.
CPC ......... *H02M 7/53871* (2013.01); *H02M 1/42* (2013.01); *H02M 1/14* (2013.01); *H02M 2001/0048* (2013.01)

(58) Field of Classification Search
CPC .......... H02M 1/14; H02M 1/42; H02M 7/483; H02M 2001/0048
See application file for complete search history.

(56) References Cited

U.S. PATENT DOCUMENTS 5,757,099 A * 5/1998 Cheng ........................ H02J 3/01
307/105
6,407,536 B1 * 6/2002 Ogusa ....................... H02M 1/32
323/207

(Continued)

FOREIGN PATENT DOCUMENTS

| JP | 8-23679 A | 1/1996 |
| JP | 2007-318820 A | 12/2007 |
| JP | 2009-124799 | 6/2009 |

OTHER PUBLICATIONS

Indian Office Action dated Jul. 31, 2020 in Indian Patent Application No. 201917043588, 6 pages.

(Continued)

*Primary Examiner* — Yusef A Ahmed
(74) *Attorney, Agent, or Firm* — Oblon, McClelland, Maier & Neustadt, L.L.P.

(57) ABSTRACT

A power conversion device includes a three-phase voltage inverter, a two-phase/three-phase converter, a tertiary harmonic wave generator, an adder, a PWM controller, and a tertiary harmonic wave amplitude determining unit. The tertiary harmonic wave generator generates a sinusoidal tertiary harmonic wave signal synchronized with three-phase voltage command signals and having a frequency which is three times as high as that of the three-phase voltage command signal. Further, the tertiary harmonic wave generator includes a tertiary harmonic wave amplitude determining unit for determining the amplitude of the tertiary harmonic wave signal at which the power loss of a three-phase voltage inverter is minimized, based on a voltage amplitude command value responding to two-phase voltage command signals and an output power factor command value responding to an output request to a power system.

3 Claims, 8 Drawing Sheets

(51) Int. Cl.
*H02M 1/42* (2007.01)
*H02M 1/14* (2006.01)
*H02M 1/00* (2006.01)

(56) References Cited

U.S. PATENT DOCUMENTS

| | | | | |
|---|---|---|---|---|
| 9,712,084 | B2* | 7/2017 | Kikuchi | H02M 7/53871 |
| 9,948,223 | B2* | 4/2018 | Ishida | H02P 21/10 |
| 10,727,770 | B2* | 7/2020 | Xu | H02P 21/09 |
| 10,763,769 | B2* | 9/2020 | Xu | H02P 21/0089 |
| 10,897,218 | B1* | 1/2021 | Bi | H02P 27/14 |
| 2001/0048290 | A1* | 12/2001 | Underwood | H02J 3/40 |
| | | | | 322/20 |
| 2006/0273748 | A1* | 12/2006 | Yoshimoto | H02M 7/483 |
| | | | | 318/432 |
| 2009/0167224 | A1* | 7/2009 | Miura | B62D 5/046 |
| | | | | 318/400.23 |
| 2009/0322264 | A1* | 12/2009 | Imura | H02P 21/0089 |
| | | | | 318/400.09 |
| 2011/0156632 | A1* | 6/2011 | Cheng | H02P 27/08 |
| | | | | 318/808 |
| 2011/0187308 | A1* | 8/2011 | Suhama | H02P 6/08 |
| | | | | 318/798 |
| 2011/0273125 | A1* | 11/2011 | Yamada | H02P 27/085 |
| | | | | 318/503 |
| 2013/0314021 | A1* | 11/2013 | Yamada | H02P 25/03 |
| | | | | 318/718 |
| 2013/0328398 | A1* | 12/2013 | Kanao | H02J 3/1814 |
| | | | | 307/23 |
| 2016/0190971 | A1* | 6/2016 | Yamakawa | H02P 27/08 |
| | | | | 318/504 |
| 2019/0044427 | A1* | 2/2019 | Fujii | H02M 7/483 |
| 2019/0253014 | A1* | 8/2019 | Iwaji | H02P 27/08 |
| 2019/0367080 | A1* | 12/2019 | Yamanaka | H02P 27/06 |
| 2020/0119678 | A1* | 4/2020 | Hoshino | H02P 21/18 |
| 2020/0153375 | A1* | 5/2020 | Mori | H02M 7/53875 |
| 2020/0220481 | A1* | 7/2020 | Hayashi | H02M 7/48 |
| 2020/0373854 | A1* | 11/2020 | Tanaka | H02M 7/53871 |

OTHER PUBLICATIONS

International Search Report dated Aug. 15, 2017 in PCT/JP2017/018730 filed on May 18, 2017.

* cited by examiner

POWER CONVERSION DEVICE SUPERIMPOSING A TERTIARY HARMONIC WAVE

FIELD

The present invention relates to a power conversion device.

BACKGROUND

PWM (Pulse Width Modulation) control is known as a control method for inverters. In a three-phase inverter, three-phase PWM control is performed by generating a sine wave voltage command signal for each of U, V, and W phases, and comparing these voltage command signals with a carrier signal that is a triangular wave.

However, in the PWM control based on this sine-wave triangular-wave comparison method, the voltage command signal of each phase is required to be within the amplitude of the carrier signal in order to execute modulation normally, and the amplitude of the fundamental wave of an output voltage of the inverter is limited to √3/2 or less of a DC voltage. Therefore, there is a problem that the voltage utilization factor of the DC voltage is low.

Figure 5:
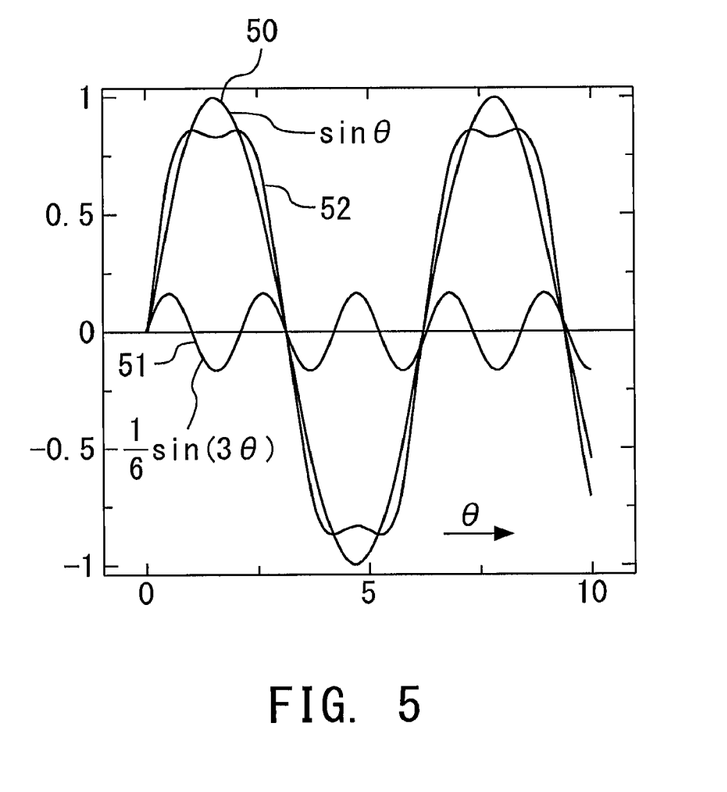
FIG. 5 is a diagram showing an example in which a tertiary harmonic wave is superimposed on a voltage command signal.
Figure 6:
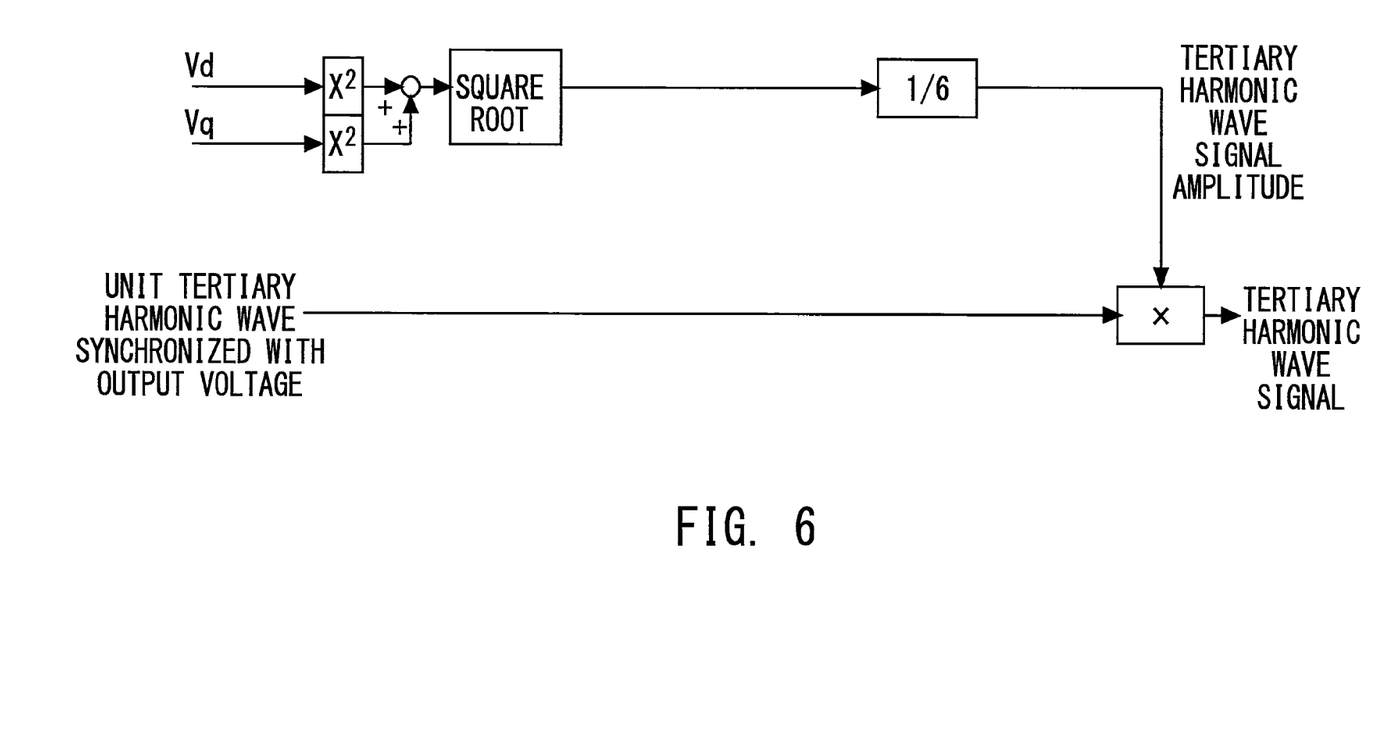
FIG. 6 is a diagram showing an example in which the amplitude of the tertiary harmonic wave signal is determined as ⅙ of the voltage command signal.

There is known a method of superimposing a tertiary harmonic wave synchronized with a three-phase voltage command signal on the three-phase voltage command signal in order to enhance the voltage utilization factor (JP 2009-124799 A). As shown in FIG. 5, a tertiary harmonic wave (51) having a frequency which is three times as high as that of the fundamental wave is superimposed on the voltage command signal (50) of each phase to reduce the peak values of the voltage command signal (52), whereby the maximum value of the fundamental wave component of the output voltage is increased, so that the voltage utilization factor of the inverter can be enhanced. This utilizes the fact that even when the tertiary harmonic wave is superimposed, a line output does not include this harmonic wave. It is also known that the voltage utilization factor can be most enhanced by setting the amplitude of the tertiary harmonic wave signal to about ⅙ of the voltage command signal (FIG. 6).

CITATION LIST

Patent Literature

[PTL 1] JP2009-124799 A

SUMMARY

Technical Problem

Therefore, the amplitude of the tertiary harmonic wave is generally set to about ⅙ of the voltage command signal in order to enhance the voltage utilization factor. However, this setting does not necessarily optimize the conversion efficiency of the inverter. According to a new finding of the present inventor, the amplitude of the tertiary harmonic wave can be used to enhance the conversion efficiency of the inverter. This will be specifically described with reference to FIGS. 7 and 8.

Figure 7:
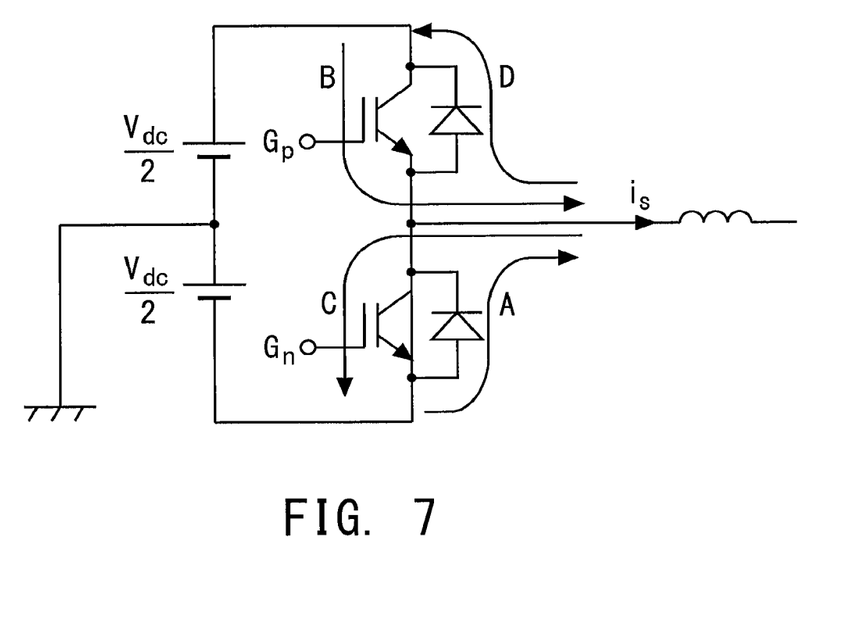
FIG. 7 is a diagram showing a path of current flowing in a voltage inverter.

FIG. 7 is a diagram showing a path of current flowing to a voltage inverter. The path through which the current flows changes according to ON/OFF of a switching element during operation of the inverter. With respect to the direction of the current, a direction in which the current flows from the inverter to a load side in FIG. 7 is defined as a positive direction. In this case, A and B are paths of current flowing in the positive direction, C and D are paths of current flowing in the negative direction. B and C are paths passing through switching elements, and A and D are paths passing through diodes.

Figure 8:
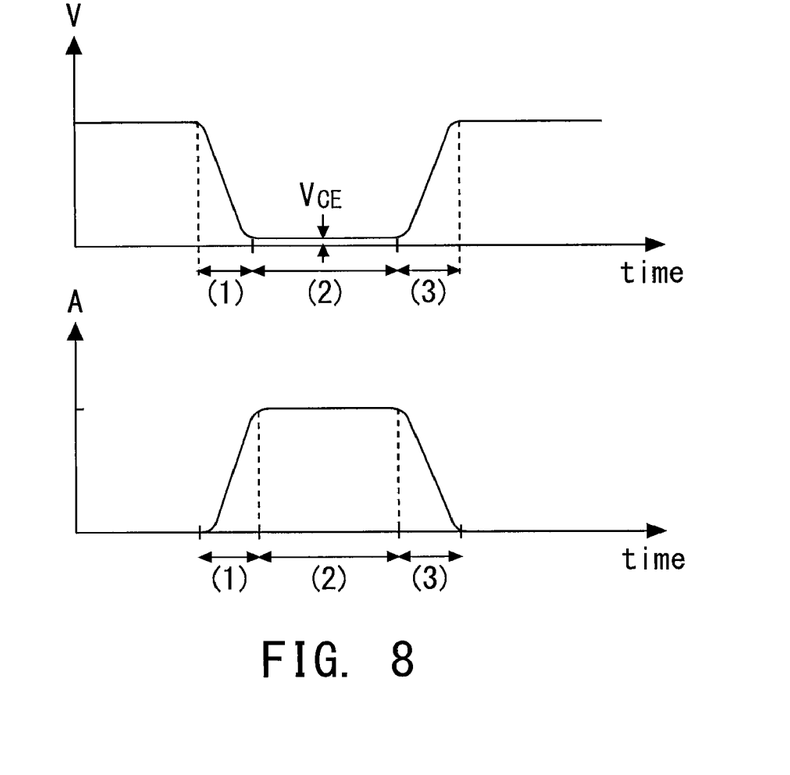
FIG. 8 is a diagram showing a loss in a switching element (transistor).

FIG. 8 is a diagram showing the loss in the switching element (transistor). It takes some time when the switching element is switched from OFF to ON and when the switching element is switched from ON to OFF. During this switching period, power loss occurs because voltage and current are not completely set to ON or OFF. In addition, since the switching element is not completely conductive even during a period when the switching element is ON, a drop voltage is generated between the collector and the emitter, so that power loss occurs there. Such power loss also occurs in other semiconductor devices (for example, diodes), but the amount of loss is different. In FIG. 8, (1) and (3) indicate power loss periods caused by switching, and (2) indicates a power loss period caused by conduction. The power loss is better to be small not only because the power loss affects the conversion efficiency, but also because the power loss is released as thermal energy and thus larger cooling means is required as the thermal energy is larger.

When the tertiary harmonic wave is superimposed on the three-phase voltage command signal as described above, the waveform of the voltage command signal changes (FIG. 5), and the state of a gate pulse, that is, the ON/OFF ratio of the inverter output voltage changes. As a result, the time ratio of currents flowing in the path having the switching element and the path having the diode also changes. Since the power loss may differ according to the current path (FIGS. 7 and 8), eventually, the conversion efficiency of the inverter may differ. The degree of change of the waveform of the voltage command signal also changes according to the amplitude of the tertiary harmonic wave to be superimposed. The present inventor has focused on this point and decided to use the amplitude of the tertiary harmonic wave to enhance the conversion efficiency of the three-phase voltage inverter.

The present invention has been made to solve the problem as described above, and has an object to provide a power conversion device capable of enhancing the conversion efficiency of a three-phase voltage inverter.

Solution to Problem

A power conversion device according to an embodiment of the present disclosure includes a three-phase voltage inverter, a two-phase/three-phase converter, a tertiary harmonic wave generator, an adder, a PWM controller, and a tertiary harmonic wave amplitude determining unit. The three-phase voltage inverter includes, for example, a circuit having three legs connected in parallel, each of the legs including two arms connected in series and each of the arms including a switching element and a freewheeling diode connected to each other in antiparallel, and converts a DC voltage from a DC power supply into a three-phase AC voltage and outputs the three-phase AC voltage to a power system. The three-phase voltage inverter is not limited to this configuration, and may be, for example, a neutral point clamp type three level inverter or a neutral point switch type three level inverter as long as it converts direct current to three-phase alternating current. The two-phase/three-phase converter converts a two-phase voltage command signal into a sinusoidal three-phase voltage command signal. The tertiary harmonic wave generator generates a sinusoidal tertiary harmonic wave signal synchronized with the three-phase voltage command signal and having a frequency which is three times as high as that of the three-phase voltage command signal. The adder outputs a three-phase modulated wave signal in which the tertiary harmonic wave signal is superimposed on the three-phase voltage command signal. The PWM controller generates a gate signal for driving each of the switching elements by comparing the three-phase modulated wave signal with a triangular wave carrier signal. Furthermore, the tertiary harmonic wave generator includes the tertiary harmonic wave amplitude determining unit for determining an amplitude of the tertiary harmonic wave signal at which a power loss of the three-phase voltage inverter is minimized, based on a voltage amplitude command value responding to the two-phase voltage command signal and an output power factor command value responding to an output request to the power system.

As described above, since the ON/OFF ratio of the gate signal changes according to the amplitude of the tertiary harmonic wave signal, the time ratio of the current flowing through the switching element and the freewheeling diode also changes. A difference occurs in power loss according to the current path (FIGS. 7 and 8), and finally, a difference occurs in the conversion efficiency of the inverter. In the present embodiment, the amplitude of the tertiary harmonic wave signal is determined so that the power loss of the three-phase voltage inverter is minimized. Therefore, according to the power conversion device 1 of the present embodiment, the conversion efficiency of the three-phase voltage inverter can be enhanced.

Preferably, the two-phase voltage command signal includes a d-axis voltage command signal and a q-axis voltage command signal. The voltage amplitude command value is a square root of the sum of a square value of the d-axis voltage command signal and a square value of the q-axis voltage command signal.

Preferably, the tertiary harmonic wave amplitude determining unit has a table for defining a relationship of the voltage amplitude command value, the output power factor command value, and the amplitude of the tertiary harmonic wave signal at which the power loss of the three-phase voltage inverter is minimized. The tertiary harmonic wave amplitude determining unit determines, from the table, an amplitude of the tertiary harmonic wave signal corresponding to a combination of the voltage amplitude command value and the output power factor command value.

Preferably, the tertiary harmonic wave amplitude determining unit determines the amplitude of the tertiary harmonic wave signal based on a function having the voltage amplitude command value and the output power factor command value as arguments. By using the function, the memory usage amount can be reduced as compared with a case where the table is used.

Advantageous Effect of Invention

According to the power conversion device of the embodiment of the present disclosure, the conversion efficiency of the three-phase voltage inverter can be enhanced.

DESCRIPTION OF EMBODIMENTS

Hereinafter, embodiments of the present disclosure will be described in detail with reference to the drawings. Elements common to the respective figures are represented by the same reference signs, and duplicative description thereof will be omitted.

First Embodiment

<System Configuration>

Figure 1:
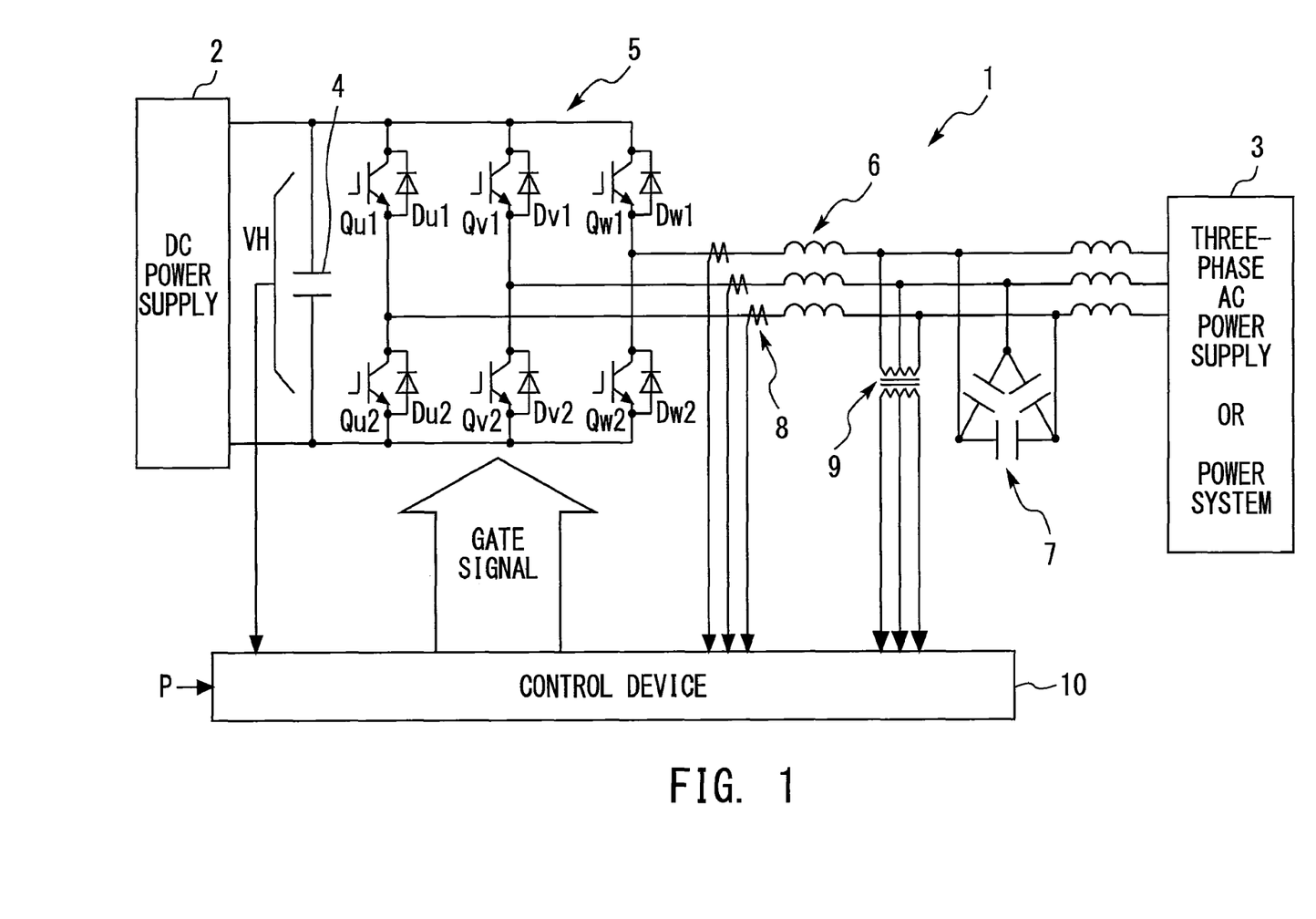
FIG. 1 is a diagram showing a system configuration of a power conversion device according to a first embodiment of the present disclosure.

FIG. 1 is a diagram showing a system configuration of a power conversion device 1 according to a first embodiment of the present disclosure.

The power conversion device 1 is connected to a DC power supply 2 and a power system 3. The DC power supply 2 is, for example, a solar photovoltaic generation device having a solar panel, a storage battery, or the like. A power plant or a factory is connected to the power system 3 via a power transmission line. The power conversion device 1 is required to maintain a currently required power factor when power is transmitted to the power system 3.

The power conversion device 1 includes a smoothing capacitor 4, a three-phase voltage inverter 5, a reactor 6, a capacitor 7, and a control device 10.

The smoothing capacitor 4 is a capacitor which is connected between the positive electrode side and the negative electrode side of the DC power supply 2 and smooths the fluctuation of a voltage VH across terminals.

The three-phase voltage inverter 5 converts a DC voltage from the DC power supply 2 into a three-phase AC voltage and outputs the three-phase AC voltage to the power system 3.

The three-phase voltage inverter 5 has a circuit in which three legs (U-phase leg, V-phase leg, W-phase leg) are connected in parallel. Each leg is configured by connecting in series two arms each including a switching element and a freewheeling diode which are connected to each other in antiparallel. The respective legs are connected in parallel between the positive electrode side and the negative electrode side of the DC power supply 2.

Specifically, the U-phase leg includes a switching element Qu1 and a switching element Qu2. The switching element Qu1 and the switching element Qu2 are connected in series in order from the positive electrode side of the DC power supply 2. An intermediate point between the switching element Qu1 and the switching element Qu2 is electrically connected to a U-phase terminal of the power system 3. The switching element Qu1 and a freewheeling diode Du1 are connected to each other in antiparallel. The switching element Qu2 and a freewheeling diode Du2 are connected to each other in antiparallel.

The V-phase leg includes a switching element Qv1 and a switching element Qv2. The switching element Qv1 and the switching element Qv2 are connected in series in order from the positive electrode side of the DC power supply 2. An intermediate point between the switching element Qv1 and the switching element Qv2 is electrically connected to a V-phase terminal of the power system 3. The switching element Qv1 and a freewheeling diode Dv1 are connected to each other in antiparallel. The switching element Qv2 and a freewheeling diode Dv2 are connected to each other in antiparallel.

The W-phase leg includes a switching element Qw1 and a switching element Qw2. The switching element Qw1 and the switching element Qw2 are connected in series in order from the positive electrode side of the DC power supply 2. An intermediate point between the switching element Qw1 and the switching element Qw2 is electrically connected to a W-phase terminal of the power system 3. The switching element Qw1 and a freewheeling diode Dw1 are connected to each other in antiparallel. The switching element Qw2 and a freewheeling diode Dw2 are connected to each other in antiparallel.

Note that in the present embodiment, an IGBT is adopted as each of the switching elements Qu1 to Qw2. However, the switching element is not limited to the IGBT, and may be a MOSFET, a bipolar transistor or the like.

The reactor 6 is a smoothing element provided between a midpoint of the respective legs of the three-phase voltage inverter 5 and the power system 3. The capacitor 7 and the reactor 6 constitute a filter circuit that reduces the ripple.

The control device 10 generates gate signals for driving the respective switching elements Qu1 to Qw2 based on an input signal. The operation of the three-phase voltage inverter 5 is controlled by the gate signal. The input signal includes the voltage VH across terminals, output current of the inverter detected by an ammeter 8, the line voltage detected by a voltmeter 9, and a power command P. The power command P is a command responding to an output request to the power system 3 which is input from the outside of the power conversion device 1.

Figure 2:
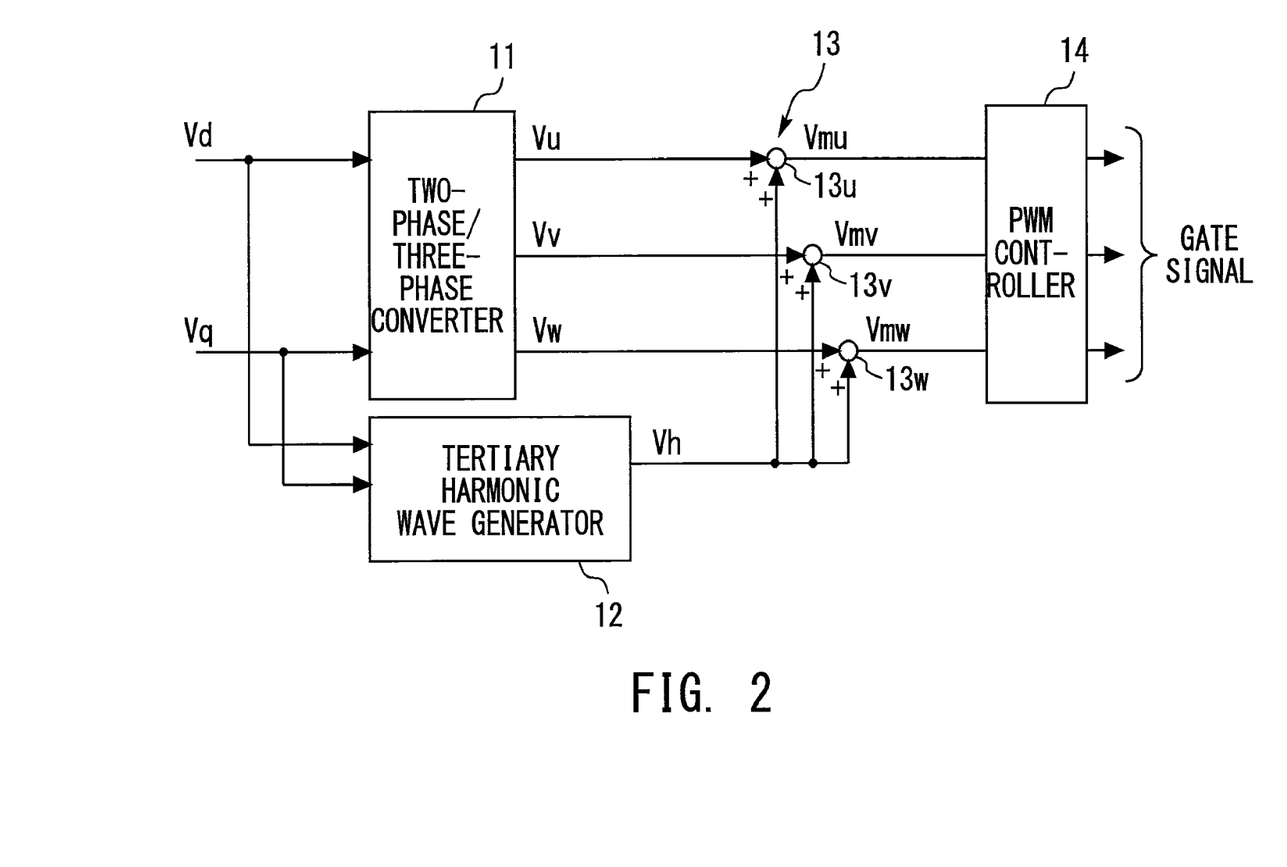
FIG. 2 is a block diagram showing a configuration of a control device according to the first embodiment of the present disclosure.

Here, the configuration of the control device 10 will be described with reference to FIG. 2. FIG. 2 is a block diagram showing a configuration of the control device 10 according to the first embodiment of the present disclosure.

As shown in FIG. 2, the control device 10 includes a two-phase/three-phase converter 11, a tertiary harmonic wave generator 12, an adder 13 (a U-phase adder 13*u*, a V-phase adder 13*v*, a W-phase adder 13*w*), and a PWM controller 14.

The two-phase/three-phase converter 11 converts two-phase voltage command signals (a d-axis voltage command signal Vd, a q-axis voltage command signal Vq) into three-phase sinusoidal voltage command signals (a U-phase voltage command signal Vu, a V-phase voltage command signal Vv and a W-phase voltage command signal Vw). The three-phase voltage command signals are output to the adder 13. Specifically, the U-phase voltage command signal Vu is output to the U-phase adder 13*u*. The V-phase voltage command signal Vv is output to the V-phase adder 13*v*. The W-phase voltage command signal Vw is output to the W-phase adder 13*w*. Note that the d-axis voltage command signal Vd and the q-axis voltage command signal Vq which are input to the two-phase/three-phase converter 11 are subjected to a calculating operation based on the power command P (an active power command and a reactive power command) input from the outside of the power conversion device 1.

The tertiary harmonic wave generator 12 generates a sinusoidal tertiary harmonic wave signal Vh that is synchronized with the three-phase voltage command signal and has a frequency which is three times as high as that of the three-phase voltage command signal. The disclosure according to this embodiment is characterized mainly in the method of determining the amplitude of the tertiary harmonic wave signal Vh, which will be described later.

The adder 13 outputs three-phase modulated wave signals in which the tertiary harmonic wave signal Vh is superimposed on the respective three-phase voltage command signals in phase. Specifically, the U-phase adder 13*u* adds the tertiary harmonic wave signal Vh generated by the tertiary harmonic wave generator 12 to the U-phase voltage command signal Vu output from two-phase/three-phase converter 11, and outputs a U-phase modulated wave signal Vmu. The V-phase adder 13*v* adds the tertiary harmonic wave signal Vh generated by the tertiary harmonic wave generator 12 to the V-phase voltage command signal Vv output from the two-phase/three-phase converter 11, and outputs a V-phase modulated wave signal Vmv. The W-phase adder 13*w* adds the tertiary harmonic wave signal Vh generated by the tertiary harmonic wave generator 12 to the W-phase voltage command signal Vw output from the two-phase/three-phase converter 11, and outputs a W-phase modulated wave signal Vmw. The U-phase modulated wave signal Vmu, the V-phase modulated wave signal Vmv, and the W-phase modulated wave signal Vmw are input to the PWM controller 14.

The PWM controller 14 compares the triangular wave carrier signal with the three-phase modulated wave signals (the U-phase modulated wave signal Vmu, the V-phase modulated wave signal Vmv, the W-phase modulated wave signal Vmw) output from the adder 13, thereby generating the gate signals for driving each of the switching elements (Qu1 to Qw2).

Specifically, with respect to the U phase, the PWM controller 14 compares the U-phase modulated wave signal Vmu with the carrier signal C (triangular waveform) having a predetermined carrier frequency f, and generates the gate signals so that the switching element Qu1 associated with an upper arm is turned on when the triangular waveform is smaller, and the switching element Qu2 associated with a lower arm is turned on when the triangular waveform is larger. The same is applied to the V-phase and the W-phase.

<Method of Determining Amplitude of Tertiary Harmonic Wave Signal Vh>

Figure 3:
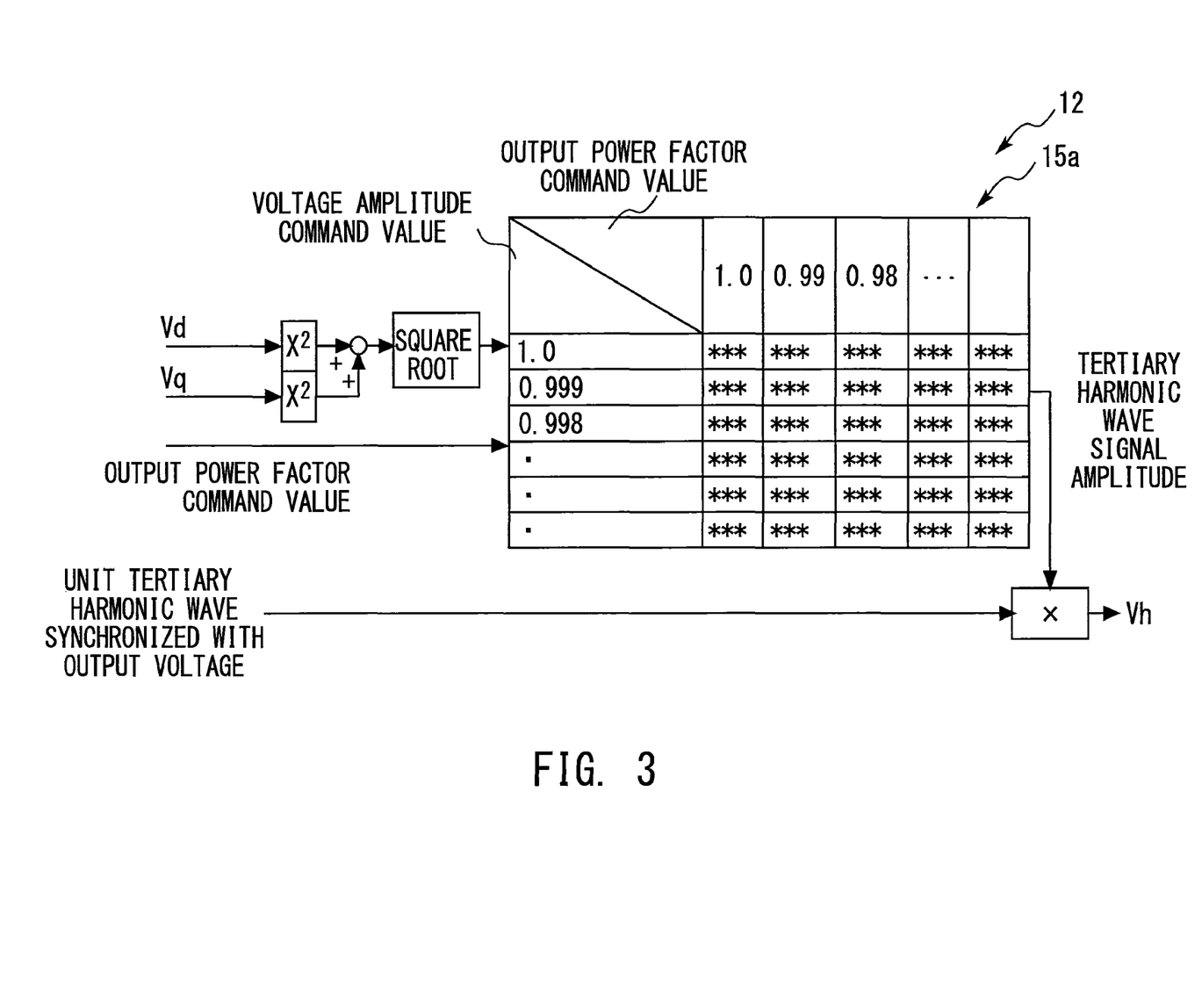
FIG. 3 is a diagram showing a method of determining the amplitude of a tertiary harmonic wave signal Vh in the first embodiment of the present disclosure.

A method of determining the amplitude of the tertiary harmonic wave signal Vh in the first embodiment of the present disclosure will be described with reference to FIG. 3.

The tertiary harmonic wave generator 12 according to the first embodiment of the present disclosure includes a tertiary harmonic wave amplitude determining unit 15*a*. The tertiary harmonic wave amplitude determining unit 15*a* determines the amplitude of the tertiary harmonic wave signal minimizing the power loss of the three-phase voltage inverter 5 based on the voltage amplitude command value responding to the two-phase voltage command signal and the output power factor command value responding to an output request to the power system 3. Note that the output power factor command value (power factor cos θ) is calculated based on the power command P (an active power command and a reactive power command) which is the current output request to the power system 3.

Specifically, first, the tertiary harmonic wave amplitude determining unit 15a receives the d-axis voltage command signal Vd, the q-axis voltage command signal Vq, and the output power factor command value described above. The tertiary harmonic wave amplitude determining unit 15a calculates a voltage amplitude command value that is the square root of the sum of the square value of the d-axis voltage command signal Vd and the square value of the q-axis voltage command signal Vq.

The tertiary harmonic wave amplitude determining unit 15a pre-stores therein a table that defines the relationship of the voltage amplitude command value, the output power factor command value, and the amplitude of the tertiary harmonic wave signal at which the power loss of the three-phase voltage inverter 5 is minimized. In this table, the amplitude of the tertiary harmonic wave signal is set in advance based on simulation analysis and actual operation data so that the conversion efficiency is maximized under each condition.

The tertiary harmonic wave amplitude determining unit 15a acquires the amplitude of the tertiary harmonic wave signal corresponding to the combination of the voltage amplitude command value and the output power factor command value from this table, and multiplies a unit tertiary harmonic wave synchronized with the output voltage by the acquired amplitude of the tertiary harmonic wave signal to determine the tertiary harmonic wave signal Vh.

The tertiary harmonic wave signal Vh whose amplitude has been determined as described above is input to the adder 13 of FIG. 2. The adder 13 outputs the three-phase modulated wave signal in which the tertiary harmonic wave signal Vh is superimposed on the three-phase voltage command signal. The PWM controller 14 generates a gate signal for driving each of the switching elements (Qu1 to Qw2) based on the three-phase modulated wave signal.

Since the ON/OFF ratio of the gate signal changes according to the amplitude of the tertiary harmonic wave signal Vh, the time ratio of current flowing through the switching element and the freewheeling diode also changes. A difference occurs in power loss according to the path of current (FIGS. 7 and 8), and finally, a difference also occurs in the conversion efficiency of the inverter. In the present embodiment, the amplitude of the tertiary harmonic wave signal Vh is determined such that the power loss of the three-phase voltage inverter 5 is minimized. Therefore, according to the power conversion device 1 of the present embodiment, the conversion efficiency of the three-phase voltage inverter 5 can be enhanced.

<Example of Hardware Configuration of Control Device 10>

Figure 9:
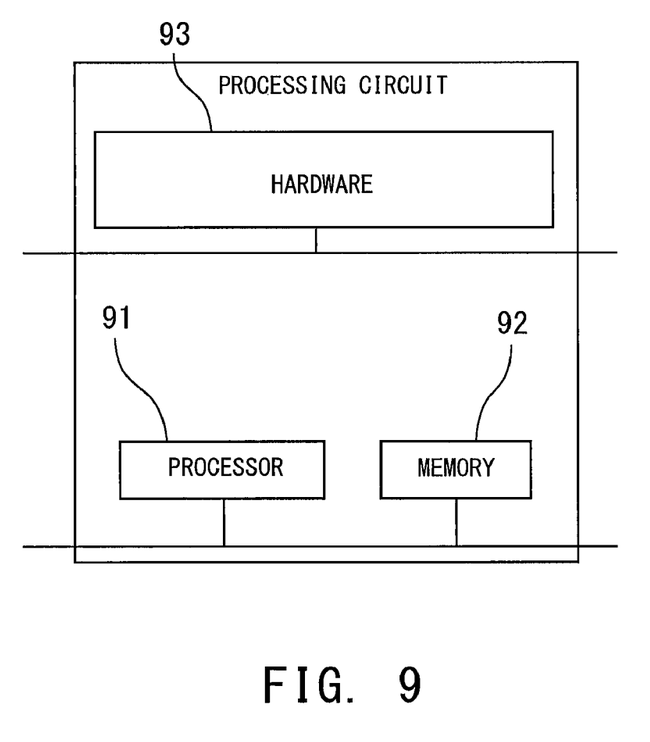
FIG. 9 is a conceptual diagram showing an example of a hardware configuration of a control device included in a power conversion device.

FIG. 9 is a conceptual diagram showing an example of a hardware configuration of the control device 10 of the power conversion device 1 described above. Components in FIG. 2 show some of functions, and each function is realized by a processing circuit. In one aspect, the processing circuit includes at least one processor 91 and at least one memory 92. In another aspect, the processing circuit includes at least one dedicated hardware 93.

When the processing circuit includes the processor 91 and the memory 92, each function is realized by software, firmware, or a combination of software and firmware. At least one of software and firmware is described as a program. At least one of the software and the firmware is stored in the memory 92. The processor 91 realizes each function by reading and executing the program stored in the memory 92.

When the processing circuit includes the dedicated hardware 93, the processing circuit is, for example, a single circuit, a complex circuit, a programmed processor, or a combination thereof. Each function is realized by a processing circuit.

Second Embodiment

Next, a second embodiment of the present disclosure will be described with reference to FIG. 4. The system of the present embodiment can be realized by applying a configuration shown in FIG. 4 to the configurations shown in FIGS. 1 and 2.

In the first embodiment described above, the tertiary harmonic wave amplitude determining unit 15a prepares in advance a table that defines the relationship of the voltage amplitude command value, the output power factor command value, and the amplitude of the tertiary harmonic wave signal at which the power loss of the three-phase voltage inverter 5 is minimized, and uses this table to determine the amplitude of the tertiary harmonic wave signal. However, in order to prepare such a table in advance, a considerable memory capacity is required. Therefore, it is desirable that the amplitude of the tertiary harmonic wave signal can be determined even when the memory capacity is small.

<Method of Determining Amplitude of Tertiary Harmonic Wave Signal Vh>

Figure 4:
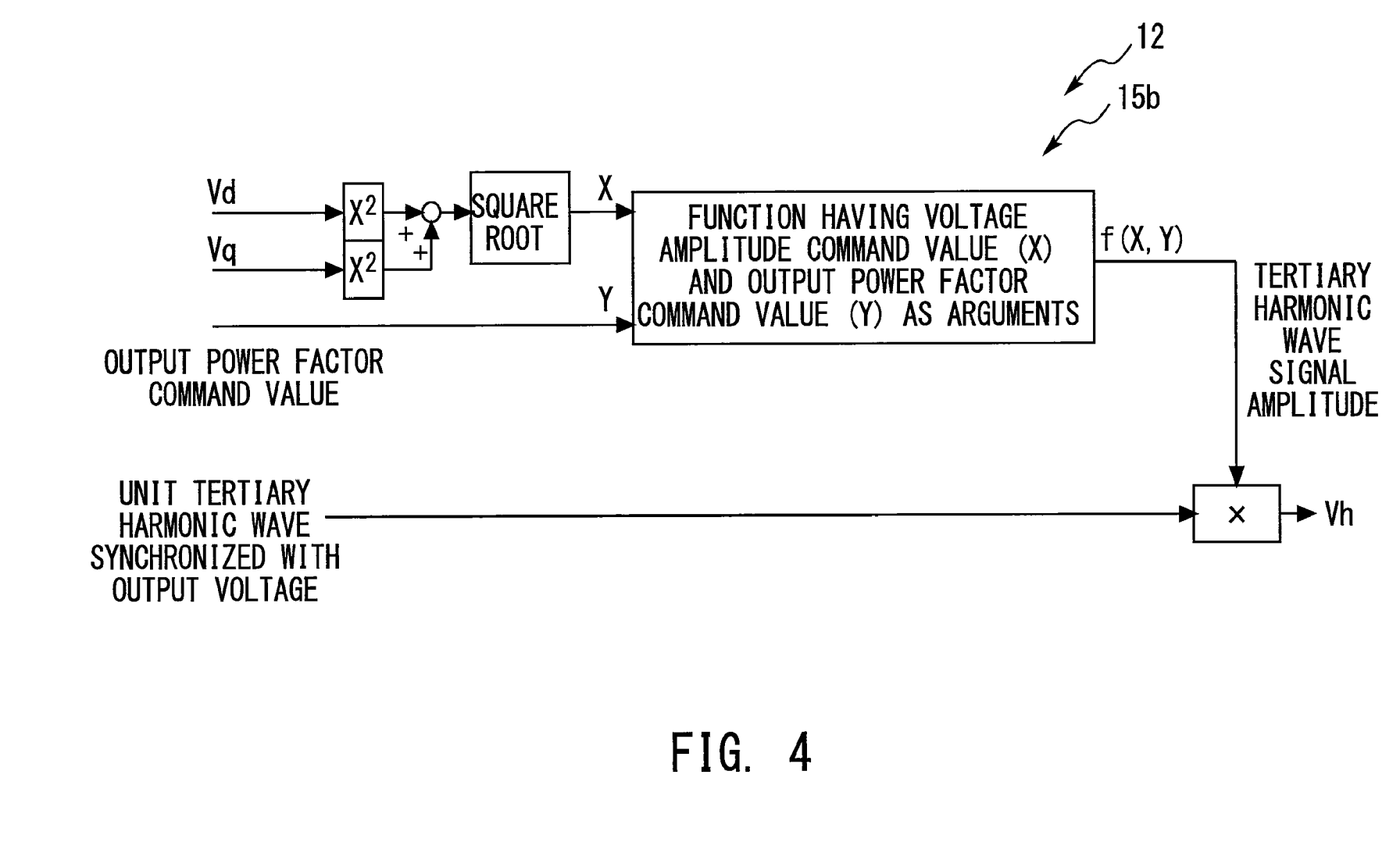
FIG. 4 is a diagram showing a method of determining the amplitude of a tertiary harmonic wave signal Vh in a second embodiment of the present disclosure.

FIG. 4 is a diagram showing a method of determining the amplitude of the tertiary harmonic wave signal Vh in the second embodiment of the present disclosure.

The tertiary harmonic wave generator 12 according to the second embodiment of the present disclosure includes a tertiary harmonic wave amplitude determining unit 15b. Based on a voltage amplitude command value responding to a two-phase voltage command signal and an output power factor command value responding to an output request to the power system 3, the tertiary harmonic wave amplitude determining unit 15b determines the amplitude of the tertiary harmonic wave signal which minimizes the power loss of the three-phase voltage inverter 5. Note that the output power factor command value (power factor cos θ) is calculated based on the power command P (the active power command and the reactive power command) which is the current output request to the power system 3.

Specifically, first, the tertiary harmonic wave amplitude determining unit 15b receives the d-axis voltage command signal Vd, the q-axis voltage command signal Vq, and the output power factor command value described above. The tertiary harmonic wave amplitude determining unit 15b calculates a voltage amplitude command value that is the square root of the sum of the square value of the d-axis voltage command signal Vd and the square value of the q-axis voltage command signal Vq.

The tertiary harmonic wave amplitude determining unit 15b acquires the amplitude of the tertiary harmonic wave signal based on a function f(X, Y) including a voltage amplitude command value (X) and an output power factor command value (Y) as arguments, and determines the tertiary harmonic wave signal Vh by multiplying the unit tertiary harmonic wave synchronized with the output voltage by the acquired amplitude of the tertiary harmonic wave signal. This function is set based on simulation analysis and actual operation data. Alternatively, the function may be an approximate function estimated from plural measured values.

Here, it is enough if the function f(X, Y) is defined for an actual operating region of the three-phase voltage inverter 5. For example, when the three-phase voltage inverter 5 is operated while the voltage amplitude command value ranges from 1.0 to 0.8 and the output power factor command value ranges from 1.0 to 0.8, it is enough if a function for the inside of this operating region is prepared. Moreover, the configuration may be also set so that the function and the table are switched according to the operating region.

The tertiary harmonic wave signal Vh whose amplitude has been determined as described above is input to the adder 13 of FIG. 2. The adder 13 outputs the three-phase modulated wave signal in which the tertiary harmonic wave signal Vh is superimposed on the three-phase voltage command signal. Then, the PWM controller 14 generates the gate signal for driving each of the switching elements (Qu1 to Qw2) based on the three-phase modulated wave signal.

According to the present embodiment, the memory usage amount can be reduced by using a function for at least a part of the operating range of the three-phase voltage inverter 5.

Although embodiments of the present disclosure have been described above, the disclosure is not limited to the foregoing embodiments, and various modifications may be implemented without departing from the subject matter of the present disclosure.

REFERENCE SIGNS LIST 1 power conversion device
2 DC power supply
3 power system
4 smoothing capacitor
5 three-phase voltage inverter
6 reactor
7 capacitor
8 ammeter
9 voltmeter
10 control device
11 two-phase/three-phase converter
12 tertiary harmonic wave generator
13 adder
13u U-phase adder
13v V-phase adder
13w W-phase adder
14 PWM controller
15a tertiary harmonic wave amplitude determining unit
15b tertiary harmonic wave amplitude determining unit
91 processor
92 memory
93 hardware
VH voltage across terminals
P power command
Du1, Du2, Dv1, Dv2, Dw1, Dw2 freewheeling diodes
Qu1, Qu2, Qv1, Qv2, Qw1, Qw2 switching elements
Vd d-axis voltage command signal
Vq q-axis voltage command signal
Vu U-phase voltage command signal
Vv V-phase voltage command signal
Vw W-phase voltage command signal
Vmu U-phase modulated wave signal
Vmv V-phase modulated wave signal
Vmw W-phase modulated wave signal
Vh tertiary harmonic wave signal

The invention claimed is:

1. A power conversion device comprising:
a three-phase voltage inverter that includes a circuit having three legs connected in parallel, each of the legs including two arms connected in series and each of the arms including a switching element and a freewheeling diode connected to each other in antiparallel, and that converts a DC voltage from a DC power supply into a three-phase AC voltage and outputs the three-phase AC voltage to a power system;
a two-phase/three-phase converter for converting a two-phase voltage command signal into a sinusoidal three-phase voltage command signal;
a tertiary harmonic wave generator for generating a sinusoidal tertiary harmonic wave signal synchronized with the sinusoidal three-phase voltage command signal and having a frequency which is three times as high as that of the sinusoidal three-phase voltage command signal;
an adder for outputting a three-phase modulated wave signal in which the sinusoidal tertiary harmonic wave signal is superimposed on the sinusoidal three-phase voltage command signal; and
a PWM controller for generating a gate signal for driving each of the switching elements by comparing the three-phase modulated wave signal with a triangular wave carrier signal, wherein the tertiary harmonic wave generator includes a tertiary harmonic wave amplitude determining unit for determining an amplitude of the sinusoidal tertiary harmonic wave signal at which a power loss of the three-phase voltage inverter is minimized, based on a voltage amplitude command value responding to the two-phase voltage command signal and an output power factor command value responding to an output request to the power system,
wherein the two-phase voltage command signal includes a d-axis voltage command signal and a q-axis voltage command signal, and the voltage amplitude command value is a square root of a sum of a square value of the d-axis voltage command signal and a square value of the q-axis voltage command signal.

2. The power conversion device according to claim 1, wherein the tertiary harmonic wave amplitude determining unit determines the amplitude of the sinusoidal tertiary harmonic wave signal corresponding to a combination of the voltage amplitude command value and the output power factor command value from a table for defining a relationship of the voltage amplitude command value, the output power factor command value, and the amplitude of the sinusoidal tertiary harmonic wave signal at which the power loss of the three-phase voltage inverter is minimized.

3. The power conversion device according to claim 1, wherein the tertiary harmonic wave amplitude determining unit determines the amplitude of the sinusoidal tertiary harmonic wave signal based on a function having the voltage amplitude command value and the output power factor command value.

* * * * *